(12) United States Patent
Walentowski

(10) Patent No.: US 12,709,323 B2
(45) Date of Patent: Aug. 18, 2026

(54) STEER-BY-WIRE STEERING SYSTEM AND METHOD

(71) Applicant: ZF Automotive Germany GmbH, Alfdorf (DE)

(72) Inventor: Stephan Walentowski, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 25 days.

(21) Appl. No.: 18/324,524

(22) Filed: May 26, 2023

(65) Prior Publication Data

US 2023/0382450 A1 Nov. 30, 2023

(30) Foreign Application Priority Data

May 30, 2022 (DE) ......................... 102022205355.9

(51) Int. Cl.
*B62D 5/04* (2006.01)
*B62D 15/02* (2006.01)

(52) U.S. Cl.
CPC ......... *B62D 5/0484* (2013.01); *B62D 15/021* (2013.01)

(58) Field of Classification Search
CPC .... B62D 5/0484; B62D 15/021; B62D 5/049; B62D 5/003; B62D 5/0457
See application file for complete search history.

(56) References Cited

U.S. PATENT DOCUMENTS

2002/0033301 A1* 3/2002 Clephas ................. B62D 5/006 180/446
2004/0011586 A1* 1/2004 Zhao ...................... B62D 5/006 180/402

(Continued)

FOREIGN PATENT DOCUMENTS

DE 10038167 A1 * 2/2002 ......... B62D 15/0245
DE 10159704 A1 8/2002

(Continued)

OTHER PUBLICATIONS

Machine Translation of DE 10038167 A1 PDF File Name: “DE10038167A1_Machine_Translation.pdf” (Year: 2002).*

(Continued)

*Primary Examiner* — Grant Moubry
*Assistant Examiner* — Ruben Picon-Feliciano
(74) *Attorney, Agent, or Firm* — Kristin L. Murphy

(57) ABSTRACT

A steer-by-wire steering system for a vehicle is disclosed. The steering system has a steering wheel, a first sensor for capturing a steering angle of the steering wheel, a processing logic unit for determining a wheel setting angle requirement on the basis of the captured steering angle, and an actuator unit for setting a wheel setting angle at wheels of the vehicle according to the wheel setting angle requirement determined by the processing logic unit. The sensor is electrically connected to the actuator unit and is supplied with electrical energy via the actuator unit. There is at least one further sensor for capturing a steering angle of the steering wheel, which further sensor is used as a fallback solution if the first sensor fails, wherein the processing logic unit is configured to process primarily a signal from the first sensor and to process the signal from the further sensor only if the first sensor fails.

19 Claims, 2 Drawing Sheets

(56) References Cited

U.S. PATENT DOCUMENTS

| | | | | |
|---|---|---|---|---|
| 2004/0167693 | A1* | 8/2004 | Yao | B62D 5/001 180/443 |
| 2004/0193344 | A1 | 9/2004 | Suzuki | |
| 2019/0241207 | A1* | 8/2019 | Jeong | B62D 15/021 |
| 2020/0130739 | A1* | 4/2020 | Kodera | B62D 6/008 |
| 2020/0398887 | A1* | 12/2020 | Boyle | B62D 5/0463 |
| 2021/0371009 | A1* | 12/2021 | Heinrich | B62D 6/008 |
| 2022/0266901 | A1* | 8/2022 | Kim | B62D 6/008 |

FOREIGN PATENT DOCUMENTS

| | | | | |
|---|---|---|---|---|
| DE | 102010045618 | A1 | 3/2012 | |
| DE | 102018116367 | A1 | 1/2019 | |
| DE | 102017123570 | A1 | 4/2019 | |
| DE | 102018114988 | A1 * | 12/2019 | B62D 15/021 |
| DE | 102019212574 | A1 | 2/2020 | |
| DE | 102019007715 | A1 * | 5/2021 | B62D 5/001 |
| DE | 102020101481 | A1 | 7/2021 | |
| DE | 102020117051 | A1 | 12/2021 | |
| JP | 2020117191 | A | 8/2020 | |

OTHER PUBLICATIONS

Machine Translation of DE 102019007715 A1 PDF File Name: “DE102019007715A1_Machine_Translation.pdf” (Year: 2021).*

Machine Translation of DE102018114988A1 PDF File Name: “DE102018114988A1_Machine_Translation.pdf” (Year: 2019).*

* cited by examiner 26
46
48
26
22
22
50
44
52
28,38
28,38
40
45
42
42
50
20
20
28,36
28,36
34
34

46
48
26
26
22
22
50
44
52
28,38
28,38
40
40
45
45
42
42
50
20
20
28,36
28,36
34
34

STEER-BY-WIRE STEERING SYSTEM AND METHOD

CROSS-REFERENCE TO RELATED APPLICATION

This application claims priority to German Priority Application No. 102022205355.9, filed May 30, 2022, the disclosure of which is incorporated herein by reference in its entirety.

TECHNICAL FIELD

The disclosure relates to a steer-by-wire steering system for a vehicle and to a method for operating a steer-by-wire steering system.

BACKGROUND

Steering systems usually comprise a toothed rack which is mounted in a linearly displaceable manner in order to adapt a wheel position. Originally, such a toothed rack is coupled to the steering wheel via a steering rod, with the result that the toothed rack is linearly displaced by rotating the steering wheel.

Motor vehicles having so-called steer-by-wire steering systems (SbW steering system), in which there is no longer a mechanical connection between the steering wheel and the toothed rack, will be increasingly used in future. The position of the steering wheel is captured electronically and the toothed rack is displaced accordingly by an electrical drive.

On account of the omission of the mechanical connection between the steering wheel and the toothed rack, it is necessary for steer-by-wire steering systems to be particularly failsafe.

Therefore, what is needed is a steer-by-wire steering system which is failsafe.

SUMMARY

A steer-by-wire steering system for a vehicle is disclosed, having a steering wheel, a first sensor for capturing a steering angle of the steering wheel, a processing logic unit for determining a wheel setting angle requirement on the basis of the captured steering angle, and an actuator unit for setting a wheel setting angle determined by the processing logic unit at wheels of the vehicle according to the wheel setting angle requirement determined by the processing logic unit. The sensor is electrically connected to the actuator unit and is supplied with electrical energy via the actuator unit. There is at least one further sensor for capturing a steering angle of the steering wheel, which further sensor is used as a fallback solution if the first sensor fails. The processing logic unit is configured to primarily process a signal from the first sensor and to process the signal from the further sensor only if the first sensor fails.

The fact that the first sensor is supplied with electrical energy via the actuator unit achieves the advantage that the first sensor does not require its own power conversion and power stabilization, which would be required if directly connected to the vehicle electrical system. This reduces the complexity of the steering system.

A steering wheel position captured by the sensor is directly transmitted to the processing logic unit, thus achieving reliable signal processing.

The processing logic unit comprises a function which makes it possible to determine the wheel steering angle requirement. In other words, the processing logic unit enables digital signal processing of the signals received from the sensor.

The processing logic unit may, in principle, be present in any desired control unit of the steering system as long as it is configured to receive signals from the sensor and to forward them to the actuator unit.

The at least one sensor is an angle sensor, for example, thus making it possible to directly determine an angular position of the steering wheel. However, it is also conceivable for the determination to be carried out in another manner in the case of other man-machine interfaces for capturing driver inputs, for example by a torque sensor or a force sensor.

The first sensor may be directly connected to the actuator unit via a signal line. The signals from the sensor can therefore be directly transmitted to the actuator unit.

According to one exemplary arrangement, the steering system comprises a steering unit, having a steering actuator for applying a torque to the steering wheel and a position sensor for capturing the position of the steering actuator, wherein the steering unit is configured to determine a steering angle of the steering wheel on the basis of a position of the steering actuator. The steering angle is therefore captured redundantly, by the sensor on the one hand and by the steering unit on the other hand. The position sensor is the further sensor which is used as a fallback solution for the first sensor.

The processing logic unit may be integrated in the steering unit and/or in the actuator unit. This means that the steering unit and/or the actuator unit has/have a corresponding control unit which is configured to capture and process the measured steering angle and to determine a corresponding wheel setting angle requirement.

Both the steering unit and the actuator unit have an accordingly configured control unit, with the result that the processing logic unit is also redundantly present.

However, only the actuator unit can cause the implementation of the wheel setting angle at the wheels. For this purpose, the actuator unit has, for example, a front axle actuator which can linearly displace a toothed rack.

The steering unit and the actuator unit are connected to one another via a communication line, for example.

The actuator unit can therefore receive information relating to a steering angle in two mutually independent ways, from the sensor on the one hand and from the steering unit on the other hand. If the sensor fails, it is consequently ensured that a steering signal is still processed and the wheel setting angle can be set accordingly.

The steering unit and the actuator unit are electrically connected directly to the vehicle electrical system and are supplied with electrical energy via the vehicle electrical system. This means that the steering unit and the actuator unit are completely independent of one another in terms of the supply with electrical energy. The supply with electrical energy is therefore particularly reliable.

Since the first sensor is supplied with electrical energy via the actuator unit, the steering unit and the first sensor are consequently supplied with electrical energy independently of one another. This additionally increases the failure safety of the steering system. For example, if there is a fault with the power supply for the first sensor, it is still ensured that the steering angle is captured, for example by the steering unit.

According to one exemplary arrangement, the steering system has a first processing path and a second processing path, wherein each processing path comprises its own processing logic unit, an actuator unit and a sensor for capturing the steering angle, and wherein the first processing path is a master path which, during normal operation, captures a steering angle and determines the wheel setting angle requirement ahead of the second processing path. As a result of two processing paths being provided, each component is redundantly provided, thus additionally increasing the failure safety of the steering system.

It is also conceivable for more than two processing paths to be provided, for example three processing paths. The failure safety is increased further by each additional processing path.

The actuator units of the first and second processing path may each be connected to one another in terms of signaling via communication lines. The processing paths can therefore communicate with one another and interchange information if necessary.

Each processing path also has a steering unit, which steering units are likewise connected to one another in terms of signaling via communication lines.

The power supplies for the processing paths are independent of one another. For example, two vehicle electrical systems which differ from one another are provided, wherein each processing path is supplied with electrical energy by a different vehicle electrical system. This ensures that the steering system operates reliably even if the power supply for a processing path fails.

The interconnection of the components in each processing path may be identical or different. In the case of a different interconnection, different failure scenarios may possibly be covered in both processing paths.

However, the first sensor is always supplied with power via the actuator unit in the first processing path which is the master path.

According to one exemplary arrangement, the sensor for capturing a steering angle of the steering wheel of the second processing path is electrically connected to the steering unit and is supplied with electrical energy via the latter. If the sensor is connected to the steering unit, it is likewise possible to dispense with separate power conversion and power stabilization since this is already carried out in the steering unit.

According to an alternative exemplary arrangement, the first sensor of both processing paths is electrically connected to the respective actuator unit and is supplied with electrical energy via the actuator unit. In this case, the sensor in the second processing path may be used for the plausibility check in order to confirm the steering angles determined by the position sensors of the steering units. A particular advantage is that, if the steering angles determined in the first steering unit and in the second steering unit differ, it is possible to determine which of the two position sensors is operating correctly by a comparison with the steering angle measured by the first sensor of the second processing path.

A method for operating a steer-by-wire steering system according to the disclosure is also disclosed herein, wherein a wheel setting angle requirement is determined by the processing logic unit during normal operation of the steering system on the basis of the steering angle captured by the first sensor, and the steering angle is captured by a further sensor if the first sensor fails. As already described in connection with the steer-by-wire steering system according to the disclosure, the first sensor does not require its own power conversion and power stabilization in this case.

For example, if there are two processing paths, a wheel setting angle requirement is determined by the processing logic unit during normal operation of the steering system on the basis of the steering angle captured by the first sensor of the first processing path, and the steering angle is captured by the position sensor of the steering unit of the first and/or second processing path if the first sensor of the first processing path fails.

If the steering angles captured by the two position sensors differ from one another, the steering angles captured by the position sensors can be compared with the steering angle captured by the first sensor of the second processing path. If the captured steering angles differ on account of a defect, it is therefore possible to determine which of the two position sensors is still operating correctly. As a result, the reliability of the steering system is particularly high even in the event of a partial failure.

BRIEF DESCRIPTION OF DRAWINGS

Further advantages and features of the disclosure will become apparent from the following description and from the accompanying drawings, to which reference is made. In the drawings.

DETAILED DESCRIPTION

Figure 1:
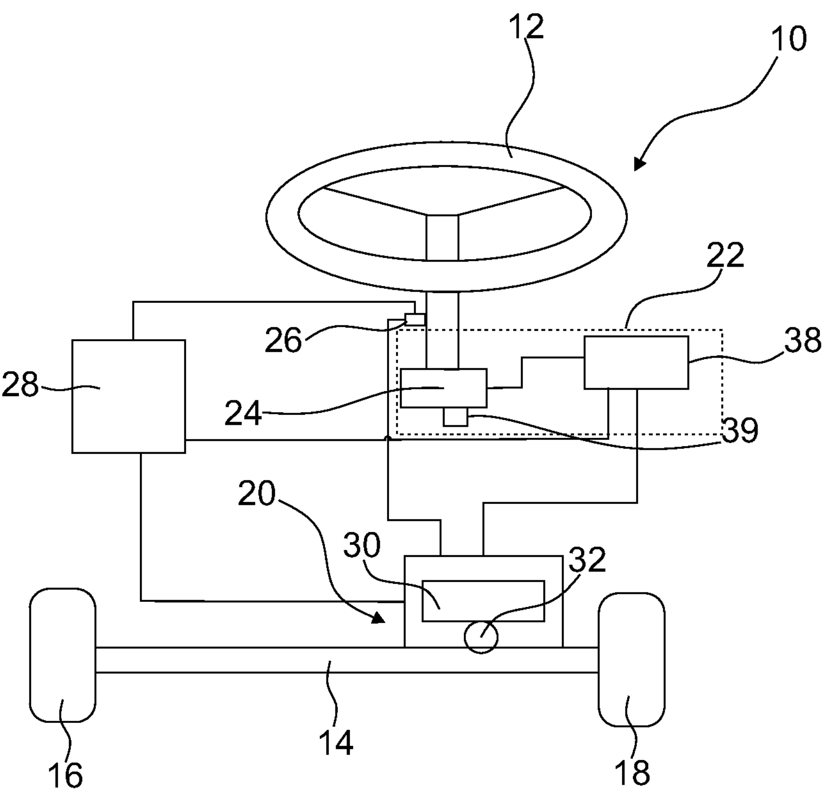
FIG. 1 schematically shows a steering system according to the disclosure.

FIG. 1 schematically illustrates a steer-by-wire steering system 10 for a vehicle, having a steering wheel 12.

The steering system 10 comprises a toothed rack 14. The toothed rack 14 is connected to a wheel carrier via track rods, which are not illustrated for the sake of simplicity, in such a manner that a linear displacement of the toothed rack 14 results in rotation of the wheel carriers about their steering axis.

The steering system 10 also comprises an actuator unit 20 for setting a wheel setting angle at the wheels 16, 18 of the vehicle on the basis of a steering angle of the steering wheel 12.

A steering unit 22 is also provided and is configured to apply a torque to the steering wheel 12. The steering unit 22 comprises a steering actuator 24 for this purpose.

A first sensor 26, which is an angle sensor, is configured to capture a steering angle of the steering wheel 12.

The steering system 10 also has a processing logic unit 28 which is configured to receive the steering angle captured by the sensor 26 and to determine a wheel setting angle requirement on the basis of the steering angle captured by the sensor 26, on the basis of which wheel setting angle requirement a wheel setting angle is set by the actuator unit 20 at the wheels 16, 18.

The processing logic unit 28 is configured to communicate with the sensor 26, the actuator unit 20 and also the steering unit 22 using signaling.

The processing logic unit 28 is schematically illustrated in FIG. 1. However, the processing logic unit 28 is not a physical unit, but rather a signal processing function.

The processing logic unit 28 may be integrated in the steering unit 22 or in the actuator unit 20 or a processing logic unit 28 may be integrated both in the steering unit 22 and in the actuator unit 20, as explained in yet more detail below.

In the exemplary arrangement illustrated, the actuator unit 20 comprises a servomotor 30 and a pinion 32 which acts on the toothed rack 14.

In an alternative exemplary arrangement, which is not illustrated for the sake of simplicity, the actuator unit 20 comprises electromotive control actuators instead of a toothed rack and a pinion 32, wherein a control actuator is assigned to each wheel 16, 18.

In the steer-by-wire steering system 10, there is no mechanical coupling between the steering wheel 12 and the wheels 16, 18. Instead, a wheel setting angle is set by the servomotor 30.

For this purpose, the pinion 32, which is in toothed engagement with the toothed rack 14, is rotated by the servomotor 30, as a result of which the toothed rack 14 is linearly moved.

Figure 2:
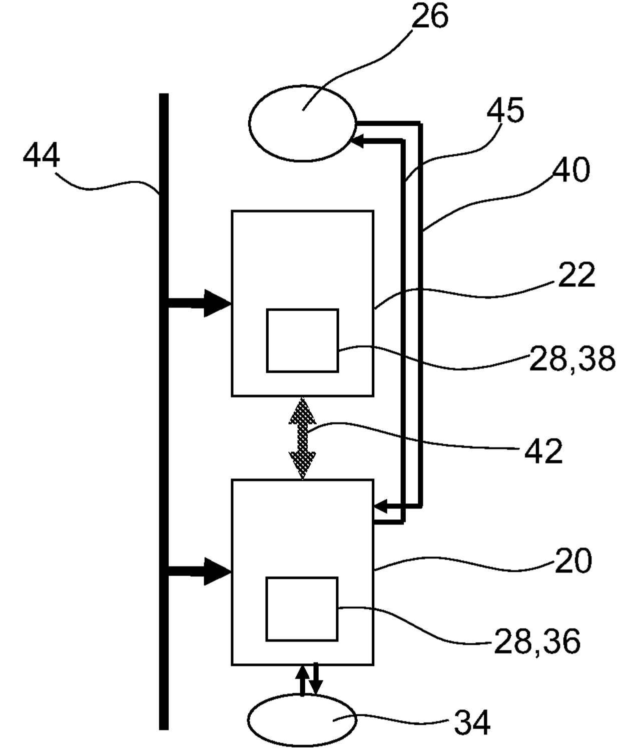
FIG. 2 schematically shows the electrical and electronic interconnection of the components of the steering system according to the disclosure, FIG. 3 schematically shows an electrical and electronic interconnection of a steering system according to the disclosure with two processing paths, and FIG. 4 schematically shows an alternative electrical and electronic interconnection of a steering system according to the disclosure with two processing paths.

FIG. 2 illustrates an electrical and electronic interconnection of the components of the steering system illustrated in FIG. 1, for example the actuator unit 20, the steering unit 22 and the first sensor 26.

FIG. 2 also illustrates a wheel setting sensor 34 which is configured to measure a wheel setting angle of the wheels 16, 18.

The actuator unit 20 can accordingly control the steering actuator 24 on the basis of a comparison of the wheel setting angle requirement with the wheel setting angle actually measured by the wheel setting sensor 34.

Both the actuator unit 20 and the steering unit 22 each have a control unit 36, 38.

The control unit 36 of the actuator unit 20 is configured to control the servomotor 30 to set a desired wheel setting angle.

In the exemplary arrangement according to FIG. 2, the processing logic unit 28 is integrated in the actuator unit 20, more precisely in the control unit 36.

The control unit 36 is therefore configured to receive and process signals from the sensor 26 relating to the steering angle in order to determine a corresponding wheel setting angle requirement.

For this purpose, the sensor 26 is connected to the actuator unit 20 via a signal line 40.

The control unit 38 of the steering unit 22 is configured to apply a torque to the steering wheel 12 by controlling the steering actuator 24 (see FIG. 1).

In addition, the steering unit 22, and more specifically, the control unit 38, is configured to determine a steering angle of the steering wheel 12 on the basis of a position of the steering actuator 24. For this purpose, the steering unit 22 may comprise a position sensor 39 (see FIG. 1) which can transmit a corresponding signal to the control unit 38.

If the sensor 26 fails, it is therefore still possible to determine a steering angle and to reliably and safely guide the vehicle. For example, the position sensor 39 is used as a fallback option for the first sensor 26.

Specifically, the processing logic unit 28 is configured to primarily process a signal from the first sensor 26 and to process the signal from the position sensor 39 only if the first sensor 26 fails.

Position sensors are often designed such that they are reset to a value of zero when the vehicle is started. That is to say, if the vehicle was parked with the steering wheel turned, the position sensor 39 will not indicate the correct absolute steering angle, but rather only a change in the steering angle. In order to be able to nevertheless correctly determine an absolute steering angle by the position sensor 39, a difference between the steering angle of zero measured by the position sensor 39 and the steering angle measured by the sensor 26 is calculated when the vehicle is started. This difference is stored until the next time the vehicle is parked and is added to the value measured by the position sensor 39.

However, it is also conceivable for the steering angle to be able to be directly derived from the value measured by the position sensor 39.

Instead of the position sensor 39, another sensor may also be provided as a fallback option.

The steering unit 22 and the actuator unit 20 are connected to one another in terms of signaling via a communication line 42, with the result that the steering angle determined by the control unit 38 can be transmitted to the actuator unit 20 or to the control unit 36 integrated in the actuator unit 20 and can be processed by the processing logic unit 28.

It is also conceivable for a processing logic unit 28 to likewise be integrated in the steering unit 22, more precisely in the control unit 38. That is to say, the processing logic unit 28 is redundantly provided in the actuator unit 20 and in the steering unit 22. In this case, a desired wheel setting angle can be transmitted directly to the actuator unit 20.

As far as the supply with electrical energy is concerned, both the actuator unit 20 and the steering unit 22 are electrically connected directly to a vehicle electrical system 44.

The vehicle electrical system 44 usually provides a voltage of 12 V.

Consequently, as far as the power supply is concerned, the actuator unit 20 and the steering unit 22 are independent of one another.

The first sensor 26 is electrically connected to the actuator unit 20 via a line 45 and is supplied with electrical energy via the actuator unit 20.

The steering system 10 according to FIG. 2 therefore still operates reliably if the first sensor 26 fails.

Specifically, a wheel setting angle requirement is determined by the processing logic unit 28 during normal operation of the steering system 10 on the basis of the steering angle captured by the first sensor 26, and the steering angle is captured by a further sensor, by the position sensor 39 in the exemplary arrangement, if the first sensor 26 fails.

Figures 3, 4:
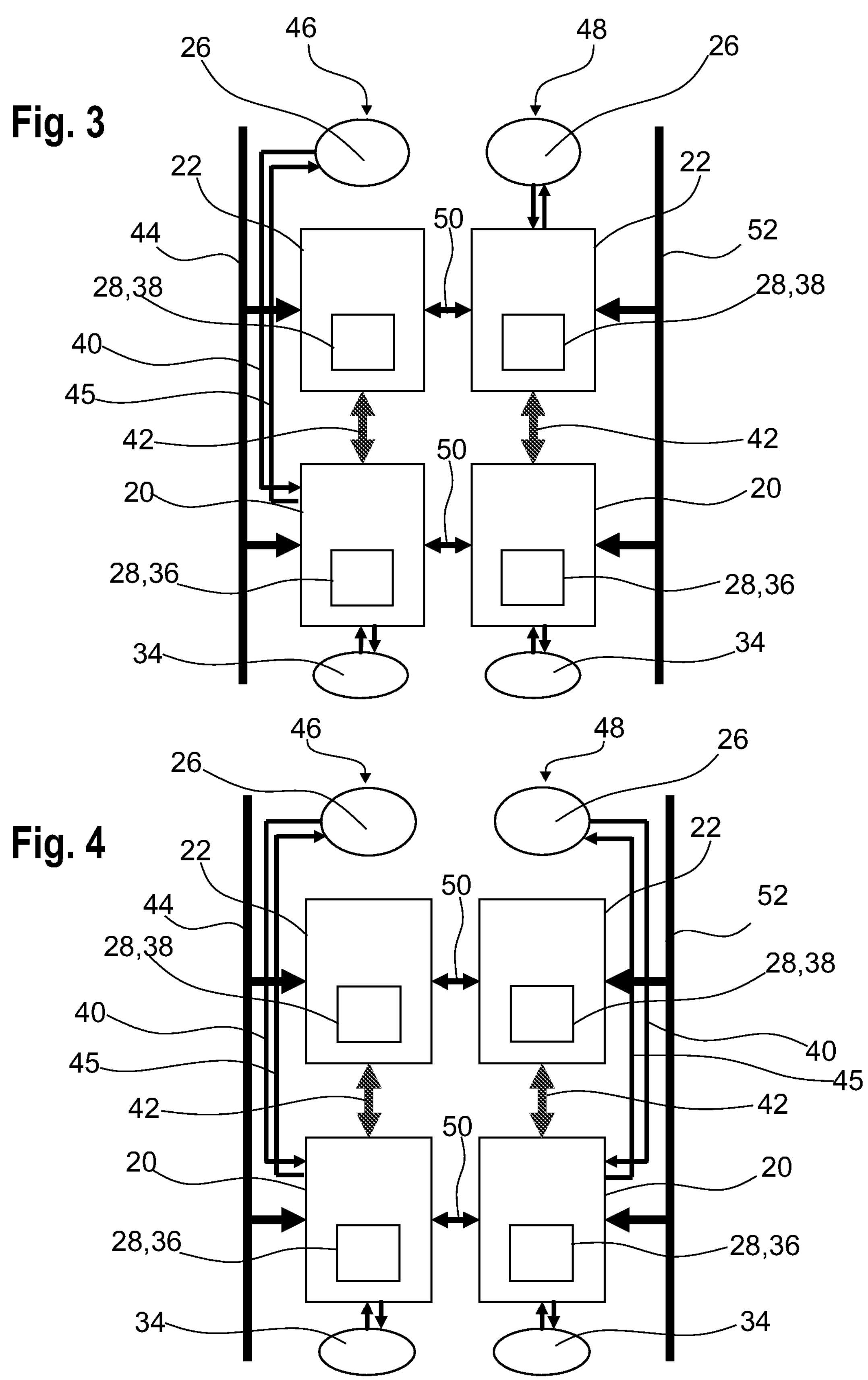

FIG. 3 illustrates an electrical and electronic interconnection of the components of the steering system 10 illustrated in FIG. 1 according to a further exemplary arrangement.

In this case, all components, more precisely the actuator unit 20, the steering unit 22, the sensor 26 and the wheel setting sensor 34, are provided in duplicate.

For example, the steering system 10 according to FIG. 3 has a first processing path 46 and a second processing path 48, wherein each processing path comprises its own actuator unit 20, a steering unit 22, a processing logic unit 28 and a first sensor 26 for capturing the steering angle.

The first processing path 46 is a master path which, during normal operation, captures a steering angle and determines the wheel setting angle requirement ahead of the second processing path 48.

Normal operation is used to mean operation in which all components of the steering system 10 are operating correctly.

The electrical and electronic interconnection in the master path corresponds to the interconnection illustrated in FIG. 2.

In the second processing path 48, the interconnection of the first sensor 26 differs, both in an electrical and in an electronic respect, from the interconnection of the sensor 26 in the first processing path 46.

Specifically, the sensor 26 is electrically connected to the steering unit 22 and is therefore supplied with electrical energy via the steering unit 22, rather than via the actuator unit 20.

In terms of signaling as well, the sensor 26 in the second processing path 48 is connected to the steering unit 22. Information relating to the steering angle is consequently forwarded in the second processing path 48 to the actuator unit 20 via the steering unit 22.

The steering units 22 and the actuator units 20 of the two processing paths 46, 48 may likewise communicate with one another via communication lines 50.

The steering system is failsafe by virtue of two parallel processing paths 46, 48 being provided.

For example, the power supplies for the processing paths 46, 48 are also independent of one another by virtue of the two processing paths 46, 48 being supplied with electrical energy by different vehicle electrical systems 44, 52.

As already described in connection with FIG. 2, provision is made for the steering angle to be determined by the first sensor 26 of the first processing path during normal operation.

The wheel setting angle requirement is then determined by the processing logic unit 28, for example in the control unit 36 of the actuator unit 20.

The actuator units 20 then set a corresponding wheel setting angle of the wheels, which can be monitored by the wheel setting sensor 34.

A failure of the steering units 22 in the first and second processing paths 46, 48 and a failure of the first sensor 26 in the second processing path 48 have no consequence for the method of operation of the steering system 10.

If the first sensor 26 in the first processing path 46 fails, there are various fallback options which ensure a reliable method of operation of the steering system 10.

On the one hand, the steering angle can be determined in the steering unit 22 of the first processing path 46, that is to say by capturing the position of the steering actuator 24 by the position sensor 39.

In a similar manner, the steering angle can be determined in the steering unit 22 of the second processing path 48.

Further alternatively, the steering angle can be captured by the sensor 26 in the second processing path 48 and can be forwarded to the steering unit 22 for further processing. This option is appropriate, when, for example, the position sensor 39 for capturing the position of the steering actuator 24 has failed, but the control unit 38 is still able to capture and at least forward the signal from the sensor 26.

In this case, the wheel setting angle requirement can be determined either in the control unit 38 of the steering unit 22 or, if the function of the latter is likewise impaired, in the control unit 36 of the actuator unit 20.

A particularly high degree of failure safety is achieved by the steering system 10 described in connection with FIG. 3.

For example, if the first sensor 26 in the first processing path 46 fails, at least two fallback options, which are completely independent of one another both in terms of the energy supply and in terms of the functional interconnection, remain. This means that a further partial failure does not result in the failure of all remaining fallback options.

This exemplary arrangement also has the advantage that the first sensor 26 of the second processing path 48 can be used for the plausibility check with regard to the functionality of the position sensors of the first and second processing paths.

For example, if the first sensor 26 of the first processing path 46 fails, the steering units 22 of the two processing paths 46, 48 may be used as a fallback option.

However, it is conceivable for one of the two position sensors 39 to likewise be defective and to transmit incorrect values. This error pattern is identified by virtue of the two position sensors 39 indicating different steering angles.

In order to identify which of the two position sensors 39 is defective and which is functional, the steering angles determined from the measured values from the position sensors 39 are compared with the steering angle measured by the first sensor 26 of the second processing path 48. The position sensor 39 whose value corresponds to the value measured by the sensor 26 is used for the further determination of the steering angle.

FIG. 4 illustrates a further electrical and electronic interconnection of the components of the steering system illustrated in FIG. 1.

The interconnection illustrated in FIG. 4 differs from the exemplary arrangement illustrated in FIG. 3 in terms of the interconnection of the sensors 26.

For example, the sensors 26 in the first processing path 46 and in the second processing path 48 are electrically and electronically connected to the actuator unit 20.

In this exemplary arrangement, the sensor 26 of the second processing path 48 is not used as a fallback option for the sensor 26 of the first processing path 46.

The plausibility check described in connection with FIG. 3 is likewise possible using the sensor 26 of the second processing path 48.

A particular advantage of the variant shown in FIG. 4 is that all sensors 26, 39 are supplied with electrical energy in different ways. For example, the sensors 26, 39 are connected in such a manner that the complete failure of an actuator unit 20 or of a steering unit 22 in each case results in the failure of only one sensor 26, 39.

The invention claimed is:

1. A steer-by-wire steering system for a vehicle, comprising: a steering wheel, a first steering-angle sensor configured to directly measure an absolute steering angle of the steering wheel, the first steering-angle sensor being electrically powered via an actuator unit of the steering system;

wherein the actuator unit is configured to set a wheel setting angle at the vehicle wheels, a steering unit comprising a steering actuator for applying torque to the steering wheel;

a second sensor comprising a position sensor of the steering actuator, the second sensor being configured to derive a steering-angle of the steering wheel based on a position of the steering actuator, a processing logic configured to:

use a steering-angle signal from the first steering-angle sensor during operation, and use the steering-angle signal derived from the position of the steering actuator via the second steering-angle sensor when the first steering-angle sensor fails, and two processing paths, including a first processing path and a second processing path, each comprising its own processing logic, actuator unit and position-sensor based steering-angle acquisition, wherein the first processing path determines a wheel-setting angle requirement ahead of the second processing path during normal operation, and wherein the steering angles determined by the position sensors of the respective processing paths are crosschecked against the output of the first steering-angle sensor of the second processing path to identify a faulty position sensor.

2. The steer-by-wire steering system as claimed in claim 1, wherein the first steering-angle sensor is directly connected to the actuator unit via a signal line.

3. The steer-by-wire steering system as claimed in claim 1, wherein the processing logic unit is integrated in the steering unit and/or in the actuator unit.

4. The steer-by-wire steering system as claimed in claim 3, wherein the steering unit and the actuator unit are connected to one another via a communication line.

5. The steer-by-wire steering system as claimed in claim 1, wherein the steering unit and the actuator unit are connected to one another via a communication line.

6. The steer-by-wire steering system as claimed in-claim 2, wherein the steering unit and the actuator unit are electrically connected directly to the vehicle electrical system and are supplied with electrical energy via the vehicle electrical system.

7. The steer-by-wire steering system as claimed in claim 1, wherein the steering unit and the actuator unit are electrically connected directly to the vehicle electrical system and are supplied with electrical energy via the vehicle electrical system.

8. The steer-by-wire steering system as claimed in claim 1, wherein the first processing path is a master path which, during normal operation, captures a steering angle and determines the wheel setting angle requirement ahead of the second processing path.

9. The steer-by-wire steering system as claimed in claim 8, wherein the actuator units of the first and the second processing path are each connected to one another in terms of signaling via communication lines.

10. The steer-by-wire steering system as claimed in claim 8, wherein the power supplies for the processing paths are independent of one another.

11. The steer-by-wire steering system as claimed in claim 8, wherein a sensor for capturing a steering angle of the steering wheel of a second processing path is electrically connected to the steering unit and is supplied with electrical energy via the second processing path.

12. The steer-by-wire steering system as claimed in claim 8, wherein the first sensor of two processing paths is electrically connected to the respective actuator unit and is supplied with electrical energy via the actuator unit.

13. A method for operating a steer-by-wire steering system as claimed in claim 1, wherein a wheel setting angle requirement is determined by the processing logic unit during normal operation of the steering system on the basis of the steering angle captured by the first sensor, and the steering angle is captured by the second sensor if the first sensor fails.

14. The method for operating a steer-by-wire steering system as claimed in claim 13, wherein a wheel setting angle requirement is determined by the processing logic unit during normal operation of the steering system on the basis of the steering angle captured by the first sensor of a first processing path, and the steering angle is captured by a position sensor of the steering unit of the first and/or of a second processing path if the first sensor of the first processing path fails.

15. The method as claimed in claim 14, wherein, if the steering angles captured by the position sensors of the steering unit of the first and the second processing path differ from one another, the steering angles captured by the position sensors are compared with the steering angle captured by the first sensor of the second processing path.

16. The system of claim 1, wherein the position of the steering actuator is obtained from a motor-position sensor integrated into the steering unit.

17. The system of claim 1, wherein steering-angle derivation from actuator position includes compensation from actuator zero-offset stored at vehicle start.

18. The system of claim 1, wherein each processing path has an independent vehicle electrical system.

19. The system of claim 1, wherein the cross-checking logic identifies a correct position sensor by matching to the first steering-angle sensor of the redundant processing path.

* * * * *